(12) United States Patent
Hamano (10) Patent No.: US 10,171,120 B2
(45) Date of Patent: Jan. 1, 2019

(54) APPARATUS AND METHOD FOR SUPPRESSING INTERMODULATION DISTORTION COMPONENT IN RECEPTION SIGNAL, AND COMMUNICATION APPARATUS

(71) Applicant: FUJITSU LIMITED, Kawasaki-shi, Kanagawa (JP)

(72) Inventor: Mitsuharu Hamano, Sendai (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/860,126

(22) Filed: Jan. 2, 2018

(65) Prior Publication Data

US 2018/0254789 A1 Sep. 6, 2018

(30) Foreign Application Priority Data

Mar. 6, 2017 (JP) ................................. 2017-042103

(51) Int. Cl.
*H04B 1/38* (2015.01)
*H04B 1/10* (2006.01)
*H04B 1/12* (2006.01)

(52) U.S. Cl.
CPC ........... *H04B 1/1081* (2013.01); *H04B 1/123* (2013.01)

(58) Field of Classification Search
CPC .......... H04B 1/12; H04B 1/38; H04B 1/0475; H04B 15/00; H04B 17/18; H04B 1/109;
(Continued)

(56) References Cited

U.S. PATENT DOCUMENTS 5,537,443 A * 7/1996 Yoshino ................. H04B 1/123
375/340
8,874,153 B2 10/2014 Bevan et al.
(Continued)

FOREIGN PATENT DOCUMENTS

JP 2008-532388 8/2008
JP 2015-530787 10/2015
(Continued)

OTHER PUBLICATIONS

USPTO, [Vuong], Non-Final Rejection dated Sep. 17, 2018 in related U.S. Appl. No. 15/899,405 [Pending]. **Reference U.S. Pat. No. 8,917,792 listed in the USOA was previously cited by the Examiner on Aug. 31, 2018.

*Primary Examiner* — Thanh Le
(74) *Attorney, Agent, or Firm* — Fujitsu Patent Center (57) ABSTRACT

An apparatus for suppressing an intermodulation distortion component in a reception signal executes acquisition to acquire a plurality of transmission signals transmitted at frequencies different from each other, executes reception to receive a reception signal including an intermodulation distortion component caused by the plurality of transmission signals, executes generation to generate a replica of the intermodulation distortion component according to the plurality of transmission signals, executes normalization to normalize the reception signal so that the reception signal has certain amplitude, executes calculation to calculate a correlation value between the normalized reception signal and the replica, executes adjustment to adjust delay in the replica relative to the reception signal according to the correlation value, and executes combination to combine the replica for which the delay is adjusted with the reception signal.

5 Claims, 8 Drawing Sheets

(58) Field of Classification Search
CPC ........ H04B 1/123; H04B 1/525; H04N 7/088; H04N 17/00
See application file for complete search history.

(56) References Cited

U.S. PATENT DOCUMENTS

| | | | |
|---|---|---|---|
| 8,917,792 B2* | 12/2014 | Black | H04B 1/0475 375/259 |
| 9,660,673 B2* | 5/2017 | Miao | H04B 1/0475 |
| 2006/0248564 A1 | 11/2006 | Zinevitch | |
| 2008/0092194 A1* | 4/2008 | Kim | H04B 7/088 725/131 |
| 2011/0274226 A1 | 11/2011 | Takeuchi | |
| 2014/0036736 A1 | 2/2014 | Wyville | |
| 2015/0349814 A1* | 12/2015 | Hirai | H04B 1/0475 375/297 |
| 2017/0208598 A1 | 7/2017 | Aoki et al. | |

FOREIGN PATENT DOCUMENTS

| | | |
|---|---|---|
| WO | 2010/082431 A1 | 7/2010 |
| WO | 2014/083361 A1 | 6/2014 |

\* cited by examiner

APPARATUS AND METHOD FOR SUPPRESSING INTERMODULATION DISTORTION COMPONENT IN RECEPTION SIGNAL, AND COMMUNICATION APPARATUS

CROSS-REFERENCE TO RELATED APPLICATION

This application is based upon and claims the benefit of priority of the prior Japanese Patent Application No. 2017-042103, filed on Mar. 6, 2017, the entire contents of which are incorporated herein by reference.

FIELD

The embodiments discussed herein are related to an apparatus and method for suppressing an intermodulation distortion component in a reception signal, and a communication apparatus.

BACKGROUND

A plurality of radio communication apparatuses may perform communication using frequencies different from each other without causing mutual interference. A radio communication apparatus that employs the frequency division duplex (FDD) technique, where a frequency band used for transmission signals and a frequency band used for reception signals differ, may perform transmission and reception in parallel.

When a plurality of radio communication apparatuses perform communication using transmission signals with different frequencies, intermodulation occurs at the time when a plurality of transmission signals are reflected off an obstacle, such as a signboard made of metal, and intermodulation distortion waves are caused accordingly. Since the frequency band of the intermodulation distortion waves is dependent on the arrangement of the frequencies of the transmission signals, the frequency band of the intermodulation distortion waves may possibly be included in the frequency band of a reception signal. When the frequency of an intermodulation distortion component and the frequency of a reception signal are equal, to remove the intermodulation distortion component using a filter or the like is difficult and the quality of reception at a radio communication apparatus decreases. It is thus under review to approximately generate an intermodulation distortion signal from a transmission signal and cancel an intermodulation distortion component included in a reception signal using the generated intermodulation distortion signal.

An intermodulation distortion component received at a radio communication apparatus delays, depending on the distance from the radio communication apparatus to the source of the intermodulation distortion component. When the delay amount of an intermodulation distortion signal regenerated in a radio communication apparatus deviates from the delay amount of an intermodulation distortion component actually received, it is difficult to cancel the intermodulation distortion component included in a reception signal even if the regenerated intermodulation distortion signal is combined with the reception signal actually received. Thus, sliding correlation between the intermodulation distortion signal regenerated from a transmission signal and the reception signal actually received is performed. The delay amount that brings the highest correlation value is set for the intermodulation distortion signal regenerated from a transmission signal and the regenerated intermodulation distortion signal is combined with the reception signal. Thus, to cancel an intermodulation distortion component included in a reception signal accurately has been suggested.

Examples of the related art include Japanese National Publication of International Patent Application No. 2015-530787 and Japanese National Publication of International Patent Application No. 2008-532388.

SUMMARY

According to an aspect of the invention, an apparatus for suppressing an intermodulation distortion component in a reception signal, includes: a memory; and processor circuitry coupled to the memory and configured to execute acquisition to acquire a plurality of transmission signals transmitted at frequencies different from each other, execute reception to receive a reception signal including an intermodulation distortion component caused by the plurality of transmission signals, execute generation to generate a replica of the intermodulation distortion component according to the plurality of transmission signals, execute normalization to normalize the reception signal so that the reception signal has certain amplitude, execute calculation to calculate a correlation value between the normalized reception signal and the replica, execute adjustment to adjust delay in the replica relative to the reception signal according to the correlation value, and execute combination to combine the replica for which the delay is adjusted with the reception signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the power of an intermodulation distortion component included in a reception signal is large in comparison with the power of reception signals as a whole, the peak of correlation values obtained through sliding correlation between an intermodulation distortion signal regenerated from a transmission signal and a reception signal increases.

Thus, a delay amount corresponding to an intermodulation distortion component included in a reception signal may be determined accurately.

When, in contrast, the power of an intermodulation distortion component included in a reception signal is small in comparison with the power of reception signals as a whole, the peak of correlation values obtained through sliding correlation between an intermodulation distortion signal regenerated from a transmission signal and a reception signal decreases and accordingly, a detection error is likely to increase. However, when the power of a reception signal whose destination is a self apparatus and which is included in reception signals is sufficiently large, interference of an intermodulation distortion component small in power may be ignored.

When signals are received from a plurality of terminals, the power of each reception signal whose destination is the self apparatus differs, depending on the terminal. In this case, both the power of an intermodulation distortion component and the power of the reception signals whose destination is the self apparatus may be small in comparison with the power of the reception signals as a whole. When the power of the reception signals whose destination is the self apparatus is small, interference of an intermodulation distortion component is relatively large and thus, it is preferable to remove the intermodulation distortion component so as to correctly receive reception signals whose destination is the self apparatus.

To remove an intermodulation distortion component included in reception signals, the delay amount of the intermodulation distortion component included in the reception signals is desired to be determined and when the power of the intermodulation distortion component is small in comparison with the power of the reception signals as a whole, the peak of the correlation values obtained through the sliding correlation is likely to be small. It is thus difficult to determine the delay amount for an intermodulation distortion component included in reception signals accurately. Accordingly, it is difficult to improve the quality of a reception signal whose destination is the self apparatus.

According to an aspect of the present disclosure, provided are techniques that may suppress an intermodulation distortion component in a reception signal accurately and improve the quality of a reception signal.

Embodiments of a communication apparatus, a communication method, and a noise canceler disclosed by the present application are described in detail below by referring to the drawings. The embodiments below are not intended to limit the disclosed techniques. The embodiments may be combined as desired only if no contradiction occurs in the contents of the processes.

First Embodiment

[Communication Apparatus 10]

Figure 1:
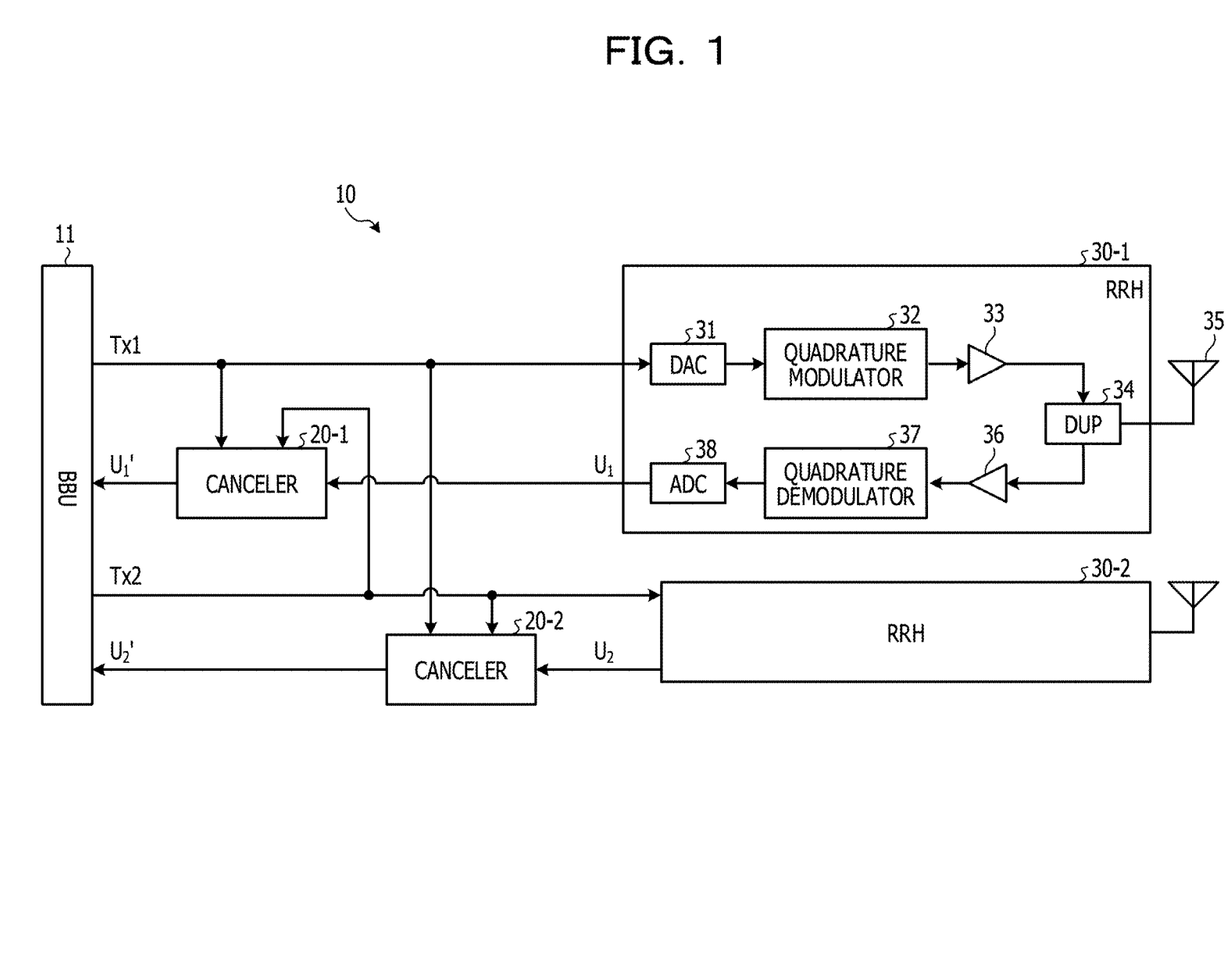
FIG. 1 is a block diagram that illustrates an example of a communication apparatus.

FIG. 1 is a block diagram that illustrates an example of a communication apparatus 10. The communication apparatus 10 includes a baseband unit (BBU) 11, cancelers 20-1 and 20-2, and remote radio heads (RRH) 30-1 and 30-2. The communication apparatus 10 according to the present embodiment is for example, a radio base station used for a radio communication system. The RRHs 30-1 and 30-2 transmit respective transmission signals with frequencies different from each other and receive respective reception signals with frequencies different from each other. In the present embodiment, the RRH 30-1 transmits a transmission signal Tx1 that is up-converted to have a frequency fD1 and the RRH 30-2 transmits a transmission signal Tx2 that is up-converted to have a frequency fD2.

It is assumed below that fD1<fD2. In addition, hereinafter, the cancelers 20-1 and 20-2 are merely referred to as the cancelers 20 when generically called without being distinguished from each other and the RRHs 30-1 and 30-2 are merely referred to as the RRHs 30 when generically called without being distinguished from each other. Each canceler 20 is an example of a noise canceler. Each RRH 30 is an example of a transmitting unit and a receiving unit.

Each RRH 30 includes a digital-to-analog converter (DAC) 31, a quadrature modulator 32, a power amplifier (PA) 33, a duplexer (DUP) 34, and an antenna 35, and these circuits may collectively be referred to as transmission circuitry. Each RRH 30 further includes a low noise amplifier (LNA) 36, a quadrature demodulator 37, and an analog-to-digital converter (ADC) 38, and these circuits may collectively be referred to as reception circuitry.

The DAC 31 converts a transmission signal output from the BBU 11 from a digital signal to an analog signal and outputs the resultant signal to the quadrature modulator 32. Using a locally generated signal, the quadrature modulator 32 performs quadrature modulation on the baseband transmission signal that has been converted to an analog signal by the DAC 31. Consequently, the baseband transmission signal is up-converted to have a frequency in an RF band. Specifically, using a locally generated signal with the frequency fD1, the quadrature modulator 32 of the RRH 30-1 performs quadrature modulation on the baseband transmission signal Tx1 that has been converted to an analog signal by the DAC 31. Using a locally generated signal with the frequency fD2, the quadrature modulator 32 of the RRH 30-2 performs quadrature modulation on the baseband transmission signal Tx2 that has been converted to an analog signal by the DAC 31. Consequently, the baseband transmission signals Tx1 and Tx2 are up-converted to have the frequencies fD1 and fD2, respectively.

The PA 33 amplifies the transmission signal that has undergone the quadrature modulation by the quadrature modulator 32. The DUP 34 allows frequency components in the transmission frequency band, which are included in the transmission signals that have been amplified by the PA 33, to pass to the antenna 35. The antenna 35 emits the transmission signals that have passed through the DUP 34 into space.

The DUP 34 further allows frequency components in the transmission frequency band, which are included in the reception signals in the RF band that have been received through the antenna 35, to pass to the LNA 36. The LNA 36 amplifies the RF band reception signals that have passed through the DUP 34. Using a locally generated signal, the quadrature demodulator 37 performs quadrature demodulation on the RF band reception signals that have been amplified by the LNA 36. Consequently, the RF band reception signals are down-converted to be in the baseband. Specifically, using a locally generated signal with a frequency fU1, the quadrature demodulator 37 of the RRH 30-1 performs quadrature demodulation on the RF band reception signals that have been amplified by the LNA 36. Using a locally generated signal with a frequency fU2, the quadrature demodulator 37 of the RRH 30-2 performs quadrature demodulation on the RF band reception signals that have been amplified by the LNA 36. Consequently, the RF band reception signals are each down-converted to be in the baseband.

The ADC 38 converts the reception signal that has undergone the quadrature demodulation by the quadrature demodulator 37 from an analog signal to a digital signal. After that, the ADC 38 outputs the reception signal that has been converted to a digital signal, U, to the canceler 20. Specifically, the ADC 38 of the RRH 30-1 outputs a reception signal $U_1$, which has been converted to a digital signal, to the canceler 20-1 and the ADC 38 of the RRH 30-2 outputs a reception signal $U_2$, which has been converted to a digital signal, to the canceler 20-2. Hereinafter, the reception signal $U_1$ output from the RRH 30-1 and the reception signal $U_2$ output from the RRH 30-2 are merely referred to as the reception signals U when generically called without being distinguished from each other.

The canceler 20-1 acquires the transmission signal Tx1 to be transmitted by the RRH 30-1 and the transmission signal Tx2 to be transmitted by the RRH 30-2 from the BBU 11. After that, according to the acquired transmission signals Tx1 and Tx2, the canceler 20-1 generates a replica of an intermodulation distortion component, which may hereinafter be referred to as a PIM signal. After that, the canceler 20-1 cancels the PIM signal included in the reception signal $U_1$ by combining the generated replica of the PIM signal with the reception signal $U_1$ output from the RRH 30-1. After that, the canceler 20-1 outputs a reception signal $U_1'$ where the PIM signal has been canceled to the BBU 11.

The canceler 20-2 acquires the transmission signal Tx1 to be transmitted by the RRH 30-1 and the transmission signal Tx2 to be transmitted by the RRH 30-2 from the BBU 11. After that, according to the acquired transmission signals Tx1 and Tx2, the canceler 20-2 generates a replica of a PIM signal. After that, the canceler 20-2 cancels the PIM signal included in the reception signal $U_2$ by combining the generated replica of the PIM signal with the reception signal $U_2$ output from the RRH 30-2. After that, the canceler 20-2 outputs a reception signal $U_1'$ where the PIM signal has been canceled to the BBU 11. Hereinafter, the reception signal $U_1'$ output from the canceler 20-1 and the reception signal $U_2'$ output from the canceler 20-2 are merely referred to as the reception signals U' when generically called without being distinguished from each other.

[Canceler 20]

Figure 2:
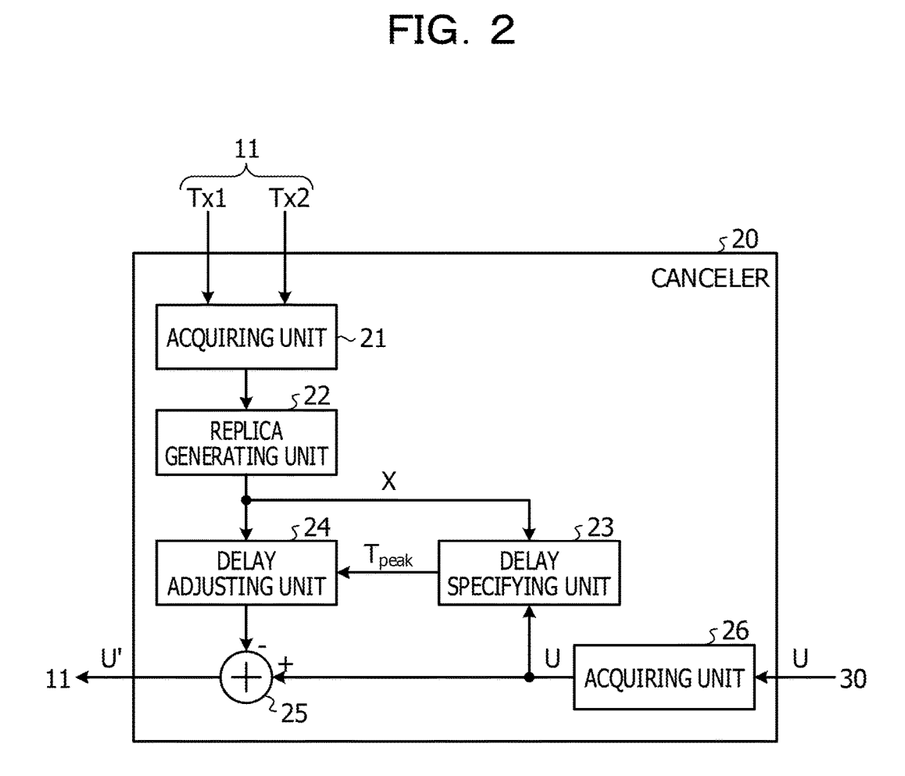
FIG. 2 is a block diagram that illustrates an example of a canceler.

FIG. 2 is a block diagram that illustrates an example of the canceler 20. As illustrated in FIG. 2 for example, the canceler 20 includes an acquiring unit 21, a replica generating unit 22, a delay specifying unit 23, a delay adjusting unit 24, a combining unit 25, and an acquiring unit 26.

The acquiring unit 21 acquires the transmission signals Tx1 and Tx2 output from the BBU 11. The acquiring unit 26 acquires the reception signal U that has been down-converted by the RRH 30 to be in the baseband.

Using the transmission signals Tx1 and Tx2 acquired by the acquiring unit 21, the replica generating unit 22 generates a replica X of a PIM signal in accordance with for example, a calculation expression (1) below. After that, the replica generating unit 22 outputs the generated replica X to the delay specifying unit 23 and the delay adjusting unit 24.

$$X = A \cdot Tx1 \cdot Tx1 \cdot \overline{Tx2} \quad (1)$$

In the calculation expression (1) above, A represents the coefficient that indicates the amplitude and phase of a PIM signal. Further, in the calculation expression (1) above, $\overline{Tx2}$ represents the complex conjugate of the transmission signal Tx2.

The calculation expression (1) above expresses components corresponding to the frequencies 2fD1 to fD2, which are included in the PIM signals generated according to the transmission signals Tx1 and Tx2. Although reduction in PIM signals corresponding to the frequencies 2fD1 to fD2 is described below, reduction in PIM signals corresponding to the frequencies other than 2fD1 to fD2 is similarly enabled by suitably selecting the frequencies of the transmission signals that constitute an object to be multiplied, which are fD1 and fD2 for example.

The delay specifying unit 23 specifies a delay amount $T_{peak}$ for a PIM signal included in the reception signal U according to the replica X of the PIM signal generated by the replica generating unit 22 and the reception signal U acquired by the acquiring unit 26. After that, the delay specifying unit 23 outputs the specified delay amount $T_{peak}$ to the delay adjusting unit 24.

According to the delay amount $T_{peak}$ specified by the delay specifying unit 23, the delay adjusting unit 24 delays the replica X of the PIM signal generated by the replica generating unit 22. After that, the delay adjusting unit 24 outputs the delayed replica X of the PIM signal to the combining unit 25.

The combining unit 25 combines the reception signal U acquired by the acquiring unit 26 and the replica X of the PIM signal output from the delay adjusting unit 24. Specifically, the combining unit 25 subtracts the replica X of the PIM signal output from the delay adjusting unit 24 from the reception signal U acquired by the acquiring unit 26. Consequently, the PIM signal included in the reception signal U may be suppressed. After that, the combining unit 25 outputs the reception signal U' after the combination to the BBU 11.

[Delay Specifying Unit 23]

Figure 3:
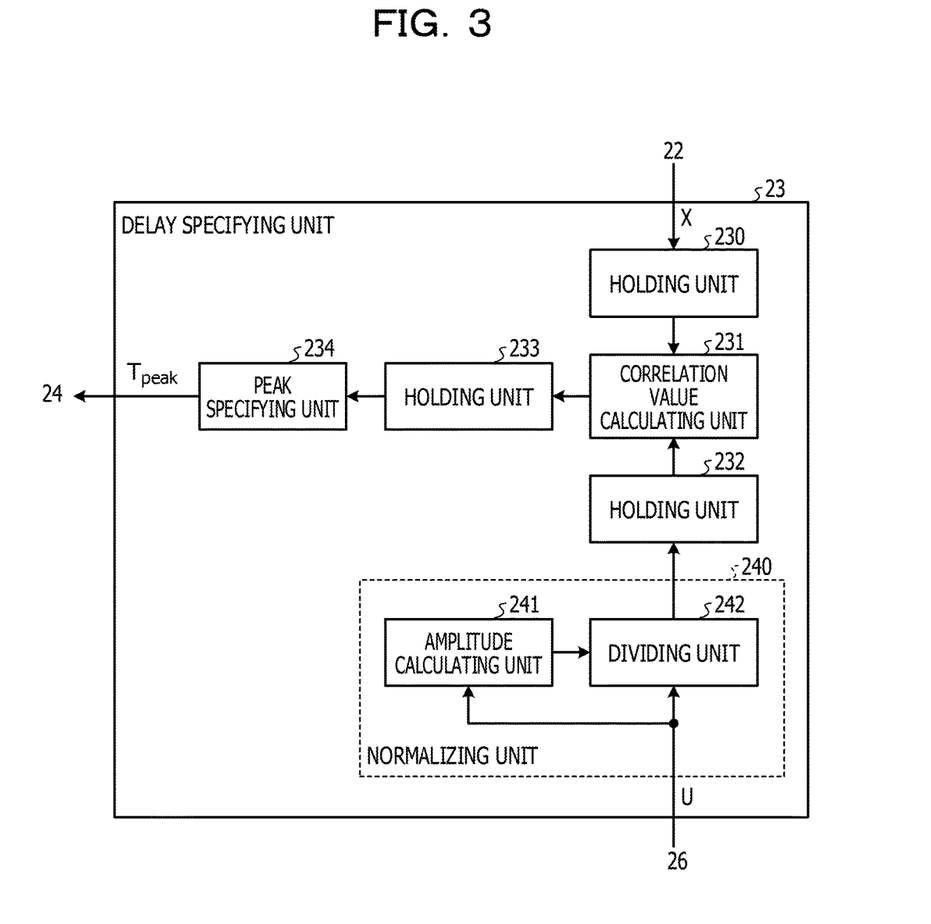
FIG. 3 is a block diagram that illustrates an example of a delay specifying unit according to a first embodiment.

FIG. 3 is a block diagram that illustrates an example of the delay specifying unit 23 according to the first embodiment. As illustrated in FIG. 3 for example, the delay specifying unit 23 includes a holding unit 230, a correlation value calculating unit 231, a holding unit 232, a holding unit 233, a peak specifying unit 234, and a normalizing unit 240.

The normalizing unit 240 normalizes the reception signal U acquired by the acquiring unit 26 so that the reception signal U has certain amplitude. In the present embodiment, the normalizing unit 240 includes an amplitude calculating unit 241 and a dividing unit 242.

The amplitude calculating unit 241 calculates amplitude |U(n)| of the reception signal U(n) acquired by the acquiring unit 26 for each sample n. After that, the amplitude calculating unit 241 outputs the calculated amplitude |U(n)| to the dividing unit 242. The reception signal U(n) indicates a reception signal in the sample n. The reception signal U(n) at each sample timing is a complex vector.

The dividing unit 242 divides the reception signal U(n) acquired by the acquiring unit 26 by the amplitude |U(n)| output from the amplitude calculating unit 241 for each sample n. The dividing unit 242 divides the reception signal U(n) that is a complex vector by the amplitude |U(n)|. Consequently, the reception signal U(n) is normalized as a unit vector $U_{normal}(n)$ that has a phase of the reception signal U(n) and amplitude of 1. After that, for each sample n, the dividing unit 242 outputs the values of the normalized unit vector $U_{normal}(n)$, which are the value of the real part and the value of the imaginary part, to the holding unit 232.

The holding unit 232 holds the values of the unit vector $U_{normal}(n)$ output from the dividing unit 242 for each sample n so that the number of sets of the values of the unit vector $U_{normal}(n)$ is a predetermined number, which is N+1 for example.

The holding unit 230 holds data on the replica X(n) of the PIM signal generated by the replica generating unit 22 so that the number of pieces of the data is a predetermined number, which is N+1 for example. X(n) represents a replica of a PIM signal in a sample n.

The correlation value calculating unit 231 calculates correlation values between the reception signal U and the replica X while changing a delay amount t of the replica X of the PIM signal relative to the reception signal U. After that, the correlation value calculating unit 231 outputs the correlation values calculated with respect to each delay amount t to the holding unit 233. Specifically, using the predetermined number of values of the replica X(n) held in the holding unit 230 and the predetermined number of values of the unit vector $U_{normal}(n)$ held in the holding unit 232, the correlation value calculating unit 231 calculates a correlation value R(t) at the delay amount t in accordance with for example, a calculation expression (2) below.

$$R(t) = \left| \sum_{n=0}^{N} U_{normal}(n) \cdot \overline{X(n+t)} \right|^2 \quad (2)$$

$$= \left| \sum_{n=0}^{N} \frac{U(n)}{|U(n)|} \cdot \overline{X(n+t)} \right|^2$$

The correlation value calculating unit 231 calculates the correlation values between the unit vector $U_{normal}(n)$ and the replica X(n) while changing the delay amount t from 0 to W in accordance with the calculation expression (2) above. That is, the correlation value calculating unit 231 performs sliding correlation between the unit vector $U_{normal}(n)$ and the replica X(n) while the delay amount t changes from 0 to W.

The holding unit 233 holds the correlation values output from the correlation value calculating unit 231 with respect to each delay amount t by causing the correlation values to correspond to the respective delay amounts t.

When the sliding correlation by the correlation value calculating unit 231 with respect to the delay amount t from 0 to W ends, the peak specifying unit 234 refers to the holding unit 233 and specifies the maximum value in the correlation values held with respect to each delay amount t. After that, the peak specifying unit 234 specifies the delay amount t that corresponds to the maximum value in the correlation values as the delay amount $T_{peak}$ for the PIM signal included in the reception signal U. After that, the peak specifying unit 234 outputs the specified delay amount $T_{peak}$ to the delay adjusting unit 24.

Figure 4:
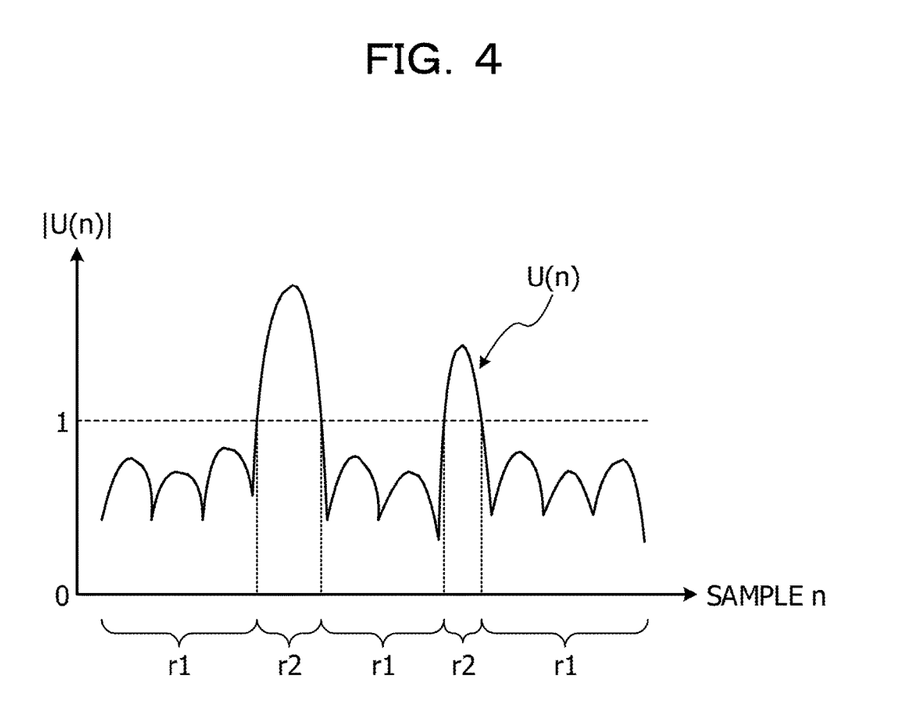
FIG. 4 illustrates an example of variation in amplitude of a reception signal.

A case is now where considered, where the amplitude |U(n)| of the reception signal U(n) varies with the sample n as illustrated in FIG. 4 for example. FIG. 4 illustrates an example of such variation in the amplitude |U(n)| of the reception signal U(n). In the example illustrated in FIG. 4, while the amplitude |U(n)| of the reception signal U(n) falls below 1 in each range r1, the amplitude |U(n)| of the reception signal U(n) exceeds 1 in each range r2.

When it is assumed that the amplitude of a PIM signal is small in comparison with the amplitude of the reception signals as a whole, as to the variation in the amplitude |U(n)| of the reception signal U(n), effect of the variation in the amplitude of the signals other than the PIM signal included in the reception signal U(n) is predominant. For example, in each range r1 illustrated in FIG. 4, the amplitude of the signals other than the PIM signal included in the reception signal U(n) is small. In contrast, in each range r2 illustrated in FIG. 4, the amplitude of the signals other than the PIM signal included in the reception signal U(n) is large. The signals other than the PIM signal and the replica X(n) have no correlation and form a noise floor in the sliding correlation. When the amplitude of the signals other than the PIM signal is large, the level of the noise floor in the sliding correlation is high. Thus, the peak of the noise floor may possibly be detected incorrectly as the peak of the correlation values.

Thus, in the present embodiment, the reception signal U(n) is normalized to be the unit vector $U_{normal}(n)$ with a phase identical to the phase of the reception signal U(n) by dividing the reception signal U(n) by the amplitude |U(n)|. After that, the sliding correlation between the unit vector $U_{normal}(n)$ and the replica X(n) is performed. Through the sliding correlation performed using the unit vector $U_{normal}(n)$ and the replica X(n), the level of the noise floor in the sliding correlation is approximately fixed, regardless of the magnitude of the amplitude |U(n)| of the reception signal U(n). Thus, the peak of the noise floor is not detected incorrectly as the peak of the correlation values because of the variation in the amplitude |U(n)| of the reception signal U(n).

Since in the present embodiment, the reception signal U(n) is normalized to be the unit vector $U_{normal}(n)$ by dividing the reception signal U(n) by the amplitude |U(n)|, for example, the amplitude |U(n)| of the reception signal U(n) in the range r1 in FIG. 4 increases. When the amplitude |U(n)| of the reception signal U(n) increases, the amplitude of the PIM signal included in the reception signal U(n) increases as well. Thus, in the range r1 in FIG. 4 for example, the correlation value between the unit vector $U_{normal}(n)$ after the normalization and the replica X(n) is large. Consequently, the correlation value at the delay amount corresponding to the PIM signal included in the reception signal U(n) is calculated as being high. Accordingly, the delay amount for the PIM signal included in the reception signal U(n) may be specified accurately. As a result of that the delay amount for the PIM signal included in the reception signal U(n) is specified accurately, the PIM signal included in the reception signal U(n) may be canceled accurately and the quality of a reception signal may be improved.

[Processes of Communication Apparatus 10]

Figure 5:
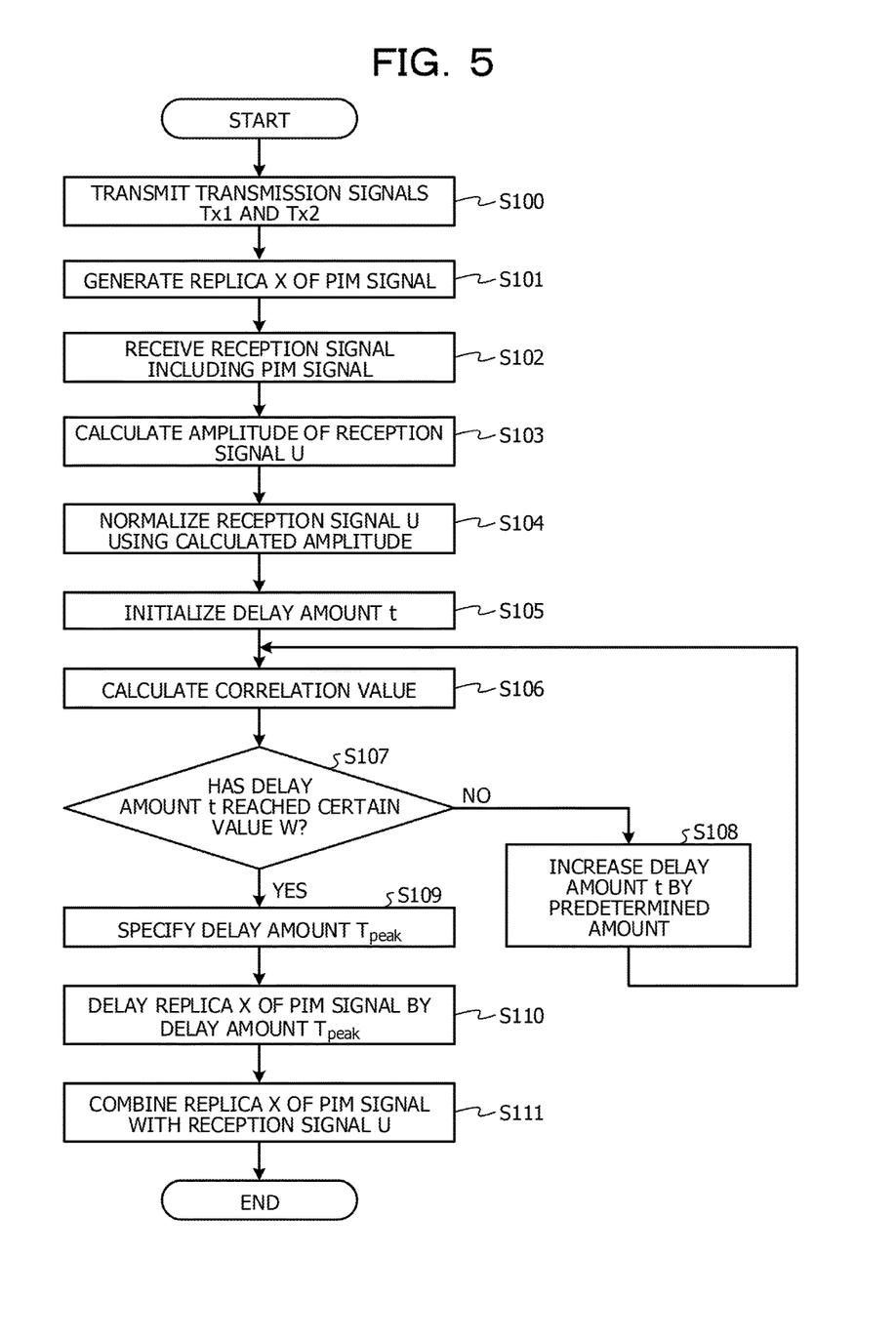
FIG. 5 is a flow chart that illustrates an example of processes performed by a communication apparatus according to the first embodiment.

FIG. 5 is a flow chart that illustrates an example of the processes performed by the communication apparatus 10 according to the first embodiment. The communication apparatus 10 executes the processes presented in the flow chart in FIG. 5 at predetermined timings.

First, the RRH 30-1 up-converts the transmission signal Tx1 output from the BBU 11 so that the transmission signal Tx1 has the frequency fD1, and transmits the resultant signal from the antenna 35 of the RRH 30-1 (S100). Further, the RRH 30-2 up-converts the transmission signal Tx2 output from the BBU 11 so that the transmission signal Tx2 has the frequency fD2, and transmits the resultant signal from the antenna 35 of the RRH 30-2 (S100).

After that, the acquiring units 21 acquire the transmission signals Tx1 and Tx2 output from the BBU 11. After that, using the transmission signals Tx1 and Tx2 acquired by the acquiring units 21, the replica generating units 22 generate the replicas X of PIM signals in accordance with for example, the calculation expression (1) described above (S101). After that, each replica generating unit 22 outputs the generated replica X to the delay specifying unit 23 and the delay adjusting unit 24. The replica X(n) generated by the replica generating unit 22 is held in the holding unit 230 for each sample n.

After that, each RRH 30 receives a reception signal including the PIM signal through the antenna 35 (S102).

After that, each RRH 30 down-converts the received reception signal with a frequency in the RF band so that the reception signal has a frequency in the baseband. After that, the RRH 30-1 converts the down-converted reception signal to a digital signal with a frequency in the baseband and outputs the reception signal $U_1$ after the conversion to the canceler 20-1. Further, the RRH 30-2 converts the down-converted reception signal to a digital signal with a frequency in the baseband and outputs the reception signal $U_2$ after the conversion to the canceler 20-2.

After that, the acquiring unit 26 acquires the reception signal U that has been down-converted by the RRH 30 to be in the baseband. The amplitude calculating unit 241 calculates the amplitude |U(n)| of the reception signal U(n) acquired by the acquiring unit 26 for each sample n (S103).

After that, using the amplitude |U(n)| calculated by the amplitude calculating unit 241, the dividing unit 242 normalizes the reception signal U(n) acquired by the acquiring unit 26 for each sample n (S104). Specifically, the dividing unit 242 divides the reception signal U(n) acquired by the acquiring unit 26 by the amplitude |U(n)| calculated by the amplitude calculating unit 241. After that, the dividing unit 242 outputs the normalized unit vector $U_{normal}(n)$ to the holding unit 232 for each sample n. The holding unit 232 holds the values of the normalized unit vector $U_{normal}(n)$ for each sample n.

After that, the correlation value calculating unit 231 initializes the delay amount t (S105). In step S105, the correlation value calculating unit 231 initializes the delay amount t to 0 for example. After that, in accordance with the calculation expression (2) described above, the correlation value calculating unit 231 calculates the correlation value between the replica X(n) delayed by the delay amount t and the normalized unit vector $U_{normal}(n)$ (S106). In step S106, the correlation value calculating unit 231 reads the replica X(n) from the holding unit 230 for each sample n and reads the unit vector $U_{normal}(n)$ from the holding unit 232. After that, the correlation value calculating unit 231 delays the read replica X(n) by the delay amount t and calculates the correlation value between the delayed replica X(n+t) and the unit vector $U_{normal}(n)$. After that, when the correlation values are calculated for a predetermined number of samples, the correlation value calculating unit 231 outputs the total of the correlation values to the holding unit 233 along with the delay amount t. The holding unit 233 holds the correlation values by causing the correlation values to correspond to the delay amount t.

After that, the correlation value calculating unit 231 determines whether the delay amount t has reached the predetermined value W (S107). When the delay amount t has not reached the predetermined value W (NO in S107), the correlation value calculating unit 231 increases the delay amount t by a predetermined amount (S108) and performs the process in step S106 again.

When the delay amount t has reached the predetermined value W (YES in S107), the peak specifying unit 234 refers to the holding unit 233 and specifies the maximum value in the correlation values held with each delay amount t. After that, the peak specifying unit 234 specifies the delay amount t corresponding to the maximum value in the correlation values as the delay amount $T_{peak}$ for the PIM signal included in the reception signal U (S109). After that, the peak specifying unit 234 outputs the specified delay amount $T_{peak}$ to the delay adjusting unit 24.

After that, the delay adjusting unit 24 delays the replica X of the PIM signal generated by the replica generating unit 22 by the delay amount $T_{peak}$ output from the peak specifying unit 234 (S110). After that, the delay adjusting unit 24 outputs the delayed replica X of the PIM signal to the combining unit 25.

After that, the combining unit 25 combines the reception signal U acquired by the acquiring unit 26 with the PIM signal replica X output from the delay adjusting unit 24 (S111). After that, the combining unit 25 outputs the reception signal U' after the combination to the BBU 11. After that, the communication apparatus 10 ends the operation indicated in the present flow chart.

Advantages of First Embodiment

The first embodiment is described above. The communication apparatus 10 according to the present embodiment includes the RRH 30, the replica generating unit 22, the normalizing unit 240, the correlation value calculating unit 231, the delay adjusting unit 24, and the combining unit 25. The RRH 30 transmits a plurality of transmission signals at frequencies different from each other. Further, the RRH 30 receives a reception signal including an intermodulation distortion component caused by the plurality of transmission signals. The replica generating unit 22 generates a replica of the intermodulation distortion component using the plurality of transmission signals. The normalizing unit 240 normalizes the reception signal so that the reception signal has certain amplitude. The correlation value calculating unit 231 calculates the correlation value between the normalized reception signal and the replica. The delay adjusting unit 24 adjusts the delay amount for the replica according to the calculated correlation value. The combining unit 25 combines the replica for which the delay amount is adjusted with the reception signal. Consequently, the communication apparatus 10 may specify the delay amount for an intermodulation distortion component included in a reception signal accurately. As a result, the communication apparatus 10 may improve the quality of a reception signal.

In the above-described embodiment, the normalizing unit 240 includes the amplitude calculating unit 241 and the dividing unit 242. The amplitude calculating unit 241 calculates the amplitude of the reception signal. The dividing unit 242 normalizes the reception signal so that the reception signal has the certain amplitude by dividing the reception signal by the amplitude of the reception signal. Consequently, effect of the signals other than the intermodulation distortion component may be reduced in the correlation values. As a result, the communication apparatus 10 may specify the delay amount for an intermodulation distortion component included in a reception signal accurately.

Second Embodiment

In the first embodiment described above, the reception signal U(n) is normalized to have certain amplitude by dividing the reception signal U(n) by the amplitude |U(n)| of the reception signal U(n). In contrast, a second embodiment is different from the first embodiment in how to normalize a reception signal U(n). Specifically, in the second embodiment, the phase of a reception signal U(n) is calculated and a signal that has the calculated phase and amplitude of 1 is generated as a normalized unit vector $U_{normal}(n)$. Differences from the first embodiment are mainly described below. The configuration of a communication apparatus 10 according to the second embodiment is similar to the configuration of the communication apparatus 10 according to the first embodiment described by referring to FIG. 1 and detailed descriptions thereof are thus omitted. The configuration of a canceler 20 according to the second embodiment is similar to the configuration of the canceler 20 according to the first embodiment described by referring to FIG. 2 and detailed descriptions thereof are thus omitted.

[Delay Specifying Unit 23]

Figure 6:
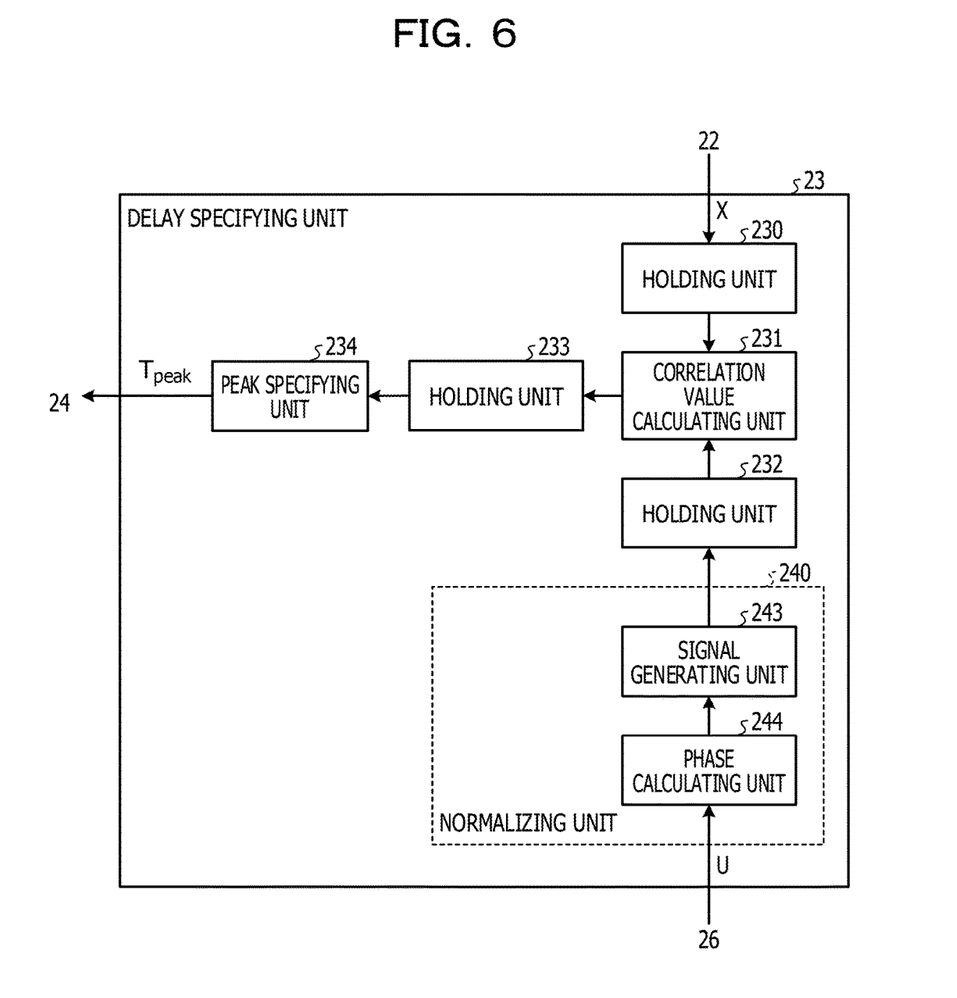
FIG. 6 is a block diagram that illustrates an example of a delay specifying unit according to a second embodiment.

FIG. 6 is a block diagram that illustrates an example of a delay specifying unit 23 according to the second embodiment. As illustrated in FIG. 6 for example, the delay specifying unit 23 includes a holding unit 230, a correlation value calculating unit 231, a holding unit 232, a holding unit 233, a peak specifying unit 234, and a normalizing unit 240. As illustrated in FIG. 6 for example, the normalizing unit 240 according to the present embodiment includes a signal generating unit 243 and a phase calculating unit 244. Except the points described below, the blocks in FIG. 6 to which reference denotations the same as the reference denotations in FIG. 3 are given have functions the same as or similar to the functions of the blocks in FIG. 3 and descriptions thereof are thus omitted.

The phase calculating unit 244 calculates a phase $\angle U(n)$ of the reception signal $U(n)$ acquired by the acquiring unit 26 in accordance with for example, a calculation expression (3) below for each sample n. After that, the phase calculating unit 244 outputs the calculated phase $\angle U(n)$ to the signal generating unit 243.

$$\angle U(n) = \tan^{-1}\left(\frac{U_q(n)}{U_i(n)}\right) \quad (3)$$

In the calculation expression (3) above, $U_i(n)$ represents an I component (a real component) of the reception signal $U(n)$ and $U_q(n)$ represents a Q component (an imaginary component) of the reception signal $U(n)$.

In accordance with for example, a calculation expression (4) below, the signal generating unit 243 generates a unit vector $U_{normal}(n)$ that has the phase $\angle U(n)$ calculated by the phase calculating unit 244 and amplitude of 1 for each sample n. The signal generating unit 243 is implemented by a numerical controlled oscillator (NCO) for example. The signal generating unit 243 outputs the values (the value of the real part and the value of the imaginary part) of the unit vector $U_{normal}(n)$ generated in accordance with the calculation expression (4) above for each sample n to the holding unit 232.

$$U_{normal}(n) = \cos \angle U(n) + j \sin \angle U(n) \quad (4)$$

Also in the present embodiment, the reception signal $U(n)$ is normalized to be the unit vector $U_{normal}(n)$ with a phase identical to the phase of the reception signal $U(n)$. After that, sliding correlation between the normalized unit vector $U_{normal}(n)$ and a replica $X(n)$ is performed. Consequently, the peak of a noise floor in the sliding correlation may be lowered and incorrect detection of the peak of the correlation values may be inhibited. When the amplitude $|U(n)|$ of the reception signal $U(n)$ is small, the amplitude of a PIM signal included in the reception signal $U(n)$ is increased by normalizing the reception signal $U(n)$. Consequently, the correlation values between the PIM signal included in the reception signal $U(n)$ and the replica $X(n)$ may become large and the delay amount for the PIM signal included in the reception signal $U(n)$ may be specified accurately.

[Processes of Communication Apparatus 10]

Figure 7:
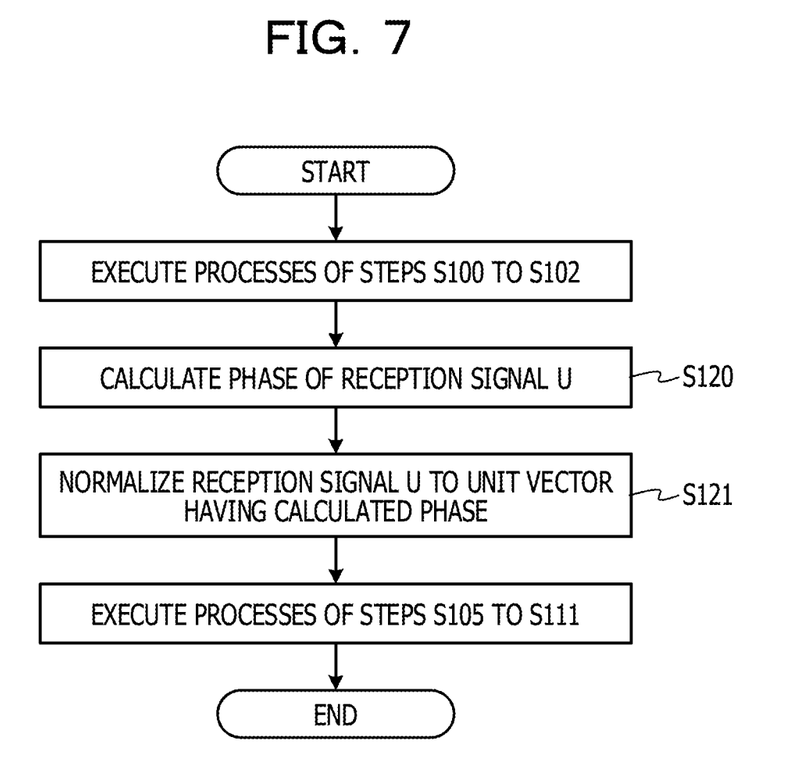
FIG. 7 is a flow chart that illustrates an example of processes performed by a communication apparatus according to the second embodiment.

FIG. 7 is a flow chart that illustrates an example of the processes performed by the communication apparatus 10 according to the second embodiment. The communication apparatus 10 executes the processes presented in the flow chart in FIG. 7 for predetermined timings. The processes in FIG. 7 to which reference denotations the same as the reference denotations in FIG. 5 are given are similar to the processes described by referring to FIG. 5 and descriptions thereof are thus omitted.

First, the processes of steps S100 to S102 are executed. After that, the acquiring unit 26 acquires the reception signal U down-converted by an RRH 30 to be in the baseband. The phase calculating unit 244 calculates the phase $\angle U(n)$ of the reception signal U acquired by the acquiring unit 26 (n) in accordance with for example, the calculation expression (3) described above for each sample n (S120). After that, the phase calculating unit 244 outputs the calculated phase $\angle U(n)$ to the signal generating unit 243.

After that, the signal generating unit 243 normalizes the reception signal $U(n)$ to the unit vector $U_{normal}(n)$ that has the phase $\angle U(n)$ calculated by the phase calculating unit 244 (S121). Specifically, in accordance with for example, the calculation expression (4) described above, the signal generating unit 243 generates the unit vector $U_{normal}(n)$ that has the phase $\angle U(n)$ calculated by the phase calculating unit 244 for each sample n. After that, the signal generating unit 243 outputs the values (the value of the real part and the value of the imaginary part) of the normalized unit vector $U_{normal}(n)$ to the holding unit 232 for each sample n. After that, the processes of steps S105 to S111 are executed.

Advantages of Second Embodiment

The second embodiment is described above. The normalizing unit 240 according to the present embodiment includes the signal generating unit 243 and the phase calculating unit 244. The phase calculating unit 244 calculates the phase of the reception signal $U(n)$. The signal generating unit 243 generates the signal $U_{normal}(n)$ with certain amplitude based on the phase $\angle U(n)$ of the reception signal $U(n)$. Consequently, effect of the signals other than an intermodulation distortion component may be reduced in the correlation values. As a result, the communication apparatus 10 may specify the delay amount for an intermodulation distortion component included in a reception signal accurately.

[Hardware]

Figure 8:
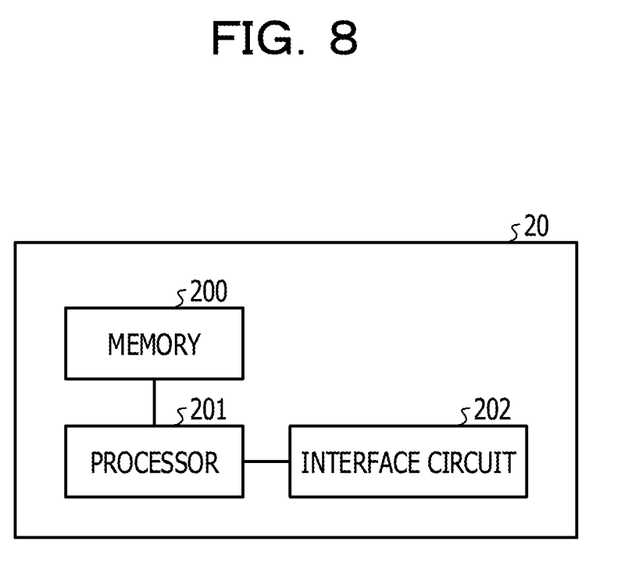
FIG. 8 illustrates an example of hardware of the canceler.

FIG. 8 illustrates an example of hardware of the canceler 20. As illustrated in FIG. 8 for example, the canceler 20 includes a memory 200, one or more processors 201, and an interface circuit 202.

The interface circuit 202 transmits and receives signals between a BBU 11 and the RRH 30 in accordance with a communication standard, such as the Common Public Radio Interface (CPRI) standard. In the memory 200, programs and data for implementing the functions of the canceler 20, and the like are stored. The one or more processors 201 execute the programs read from the memory 200 and in cooperation with the interface circuit 202 and the like, implement the functions of the canceler 20, which are for example, the respective functions of the acquiring unit 21, the replica generating unit 22, the delay specifying unit 23, the delay adjusting unit 24, the combining unit 25, the acquiring unit 26, and the like.

[Others]

The techniques disclosed herein are not limited to the above-described embodiments, and may be changed variously within the scope of the gist of the present disclosure.

For example, although in each embodiment above, the normalizing unit 240 normalizes the reception signal $U(n)$ to the unit vector $U_{normal}(n)$ with amplitude of 1, the techniques disclosed herein are not limited thereto. For another example, the normalizing unit 240 may normalize the reception signal U(n) to a vector with amplitude other than 1.

Further, although in each embodiment above, the canceler 20 is arranged in the communication apparatus 10 as an individual apparatus separate from the BBU 11 and each RRH 30, the techniques disclosed herein are not limited thereto. For example, the canceler 20 may be arranged in the BBU 11 or be arranged in each RRH 30. For another example, the canceler 20 may be implemented as an individual apparatus separate from the communication apparatus 10.

In addition, although in each embodiment above, the communication apparatus 10 is a radio base station for example, the techniques disclosed herein are not limited thereto and the communication apparatus 10 may be a radio terminal for example.

Moreover, although in each embodiment above, the processing blocks included in the communication apparatus 10 are classified on a function basis according to the main contents of the processes so as to facilitate understanding of the communication apparatus 10 in each embodiment. Thus, the techniques disclosed herein are not limited by how the processing blocks are classified or called. The processing blocks included in the communication apparatus 10 in each of the above-described embodiments may be classified into more processing blocks according to the contents of the processes or a plurality of processing blocks may be integrated into a single processing block. The processes executed by each processing block may be implemented as processes by software or be implemented by hardware dedicated to an application specific integrated circuit (ASIC) or the like, which may also be referred to as processor circuitry.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for suppressing an intermodulation distortion component in a reception signal, the apparatus comprising:
   a memory; and
   processor circuitry coupled to the memory and configured to
   execute acquisition to acquire a plurality of transmission signals transmitted at frequencies different from each other,
   execute reception to receive a reception signal including an intermodulation distortion component caused by the plurality of transmission signals,
   execute generation to generate a replica of the intermodulation distortion component according to the plurality of transmission signals,
   execute normalization to normalize the reception signal so that the reception signal has certain amplitude,
   execute calculation to calculate a correlation value between the normalized reception signal and the replica,
   execute adjustment to adjust delay in the replica relative to the reception signal according to the correlation value, and
   execute combination to combine the replica for which the delay is adjusted with the reception signal.

2. The apparatus according to claim 1,
   wherein the normalization further includes
   amplitude calculation to calculate amplitude of the reception signal, and
   division to divide the reception signal by the amplitude of the reception signal to normalize the reception signal so that the reception signal has the certain amplitude.

3. The apparatus according to claim 1,
   wherein the normalization further includes
   phase calculation to calculate a phase of the reception signal, and
   signal generation to generate a signal with the certain amplitude according to the phase of the reception signal.

4. A method performed by an apparatus for suppressing an intermodulation distortion component in a reception signal, the method comprising:
   executing, by processor circuitry of the apparatus, acquisition to acquire a plurality of transmission signals transmitted at frequencies different from each other,
   executing, by the processor circuitry of the apparatus, reception to receive a reception signal including an intermodulation distortion component caused by the plurality of transmission signals,
   executing, by the processor circuitry of the apparatus, generation to generate a replica of the intermodulation distortion component according to the plurality of transmission signals,
   executing, by the processor circuitry of the apparatus, normalization to normalize the reception signal so that the reception signal has certain amplitude,
   executing, by the processor circuitry of the apparatus, calculation to calculate a correlation value between the normalized reception signal and the replica,
   executing, by the processor circuitry of the apparatus, adjustment to adjust delay in the replica relative to the reception signal according to the correlation value, and
   executing, by the processor circuitry of the apparatus, combination to combine the replica for which the delay is adjusted with the reception signal.

5. A communication apparatus comprising:
   transmission circuitry configured to transmit a plurality of transmission signals at frequencies different from each other;
   reception circuitry configured to receive a reception signal;
   a memory; and
   processor circuitry configured to
   execute acquisition to acquire the plurality of transmission signals,
   execute reception to receive the reception signal including an intermodulation distortion component caused by the plurality of transmission signals,
   execute generation to generate a replica of the intermodulation distortion component according to the plurality of transmission signals,
   execute normalization to normalize the reception signal so that the reception signal has certain amplitude,
   execute calculation to calculate a correlation value between the normalized reception signal and the replica, execute adjustment to adjust delay in the replica relative to the reception signal according to the correlation value, and execute combination to combine the replica for which the delay is adjusted with the reception signal.

\* \* \* \* \*